United States Patent [19]

Farmer

[11] Patent Number: 4,475,674
[45] Date of Patent: Oct. 9, 1984

[54] GOOSE DECOY BACK PACK

[76] Inventor: Thomas E. Farmer, P.O. Box 748, Galveston, Tex. 77550

[21] Appl. No.: 362,229

[22] Filed: Mar. 26, 1982

Related U.S. Application Data

[63] Continuation-in-part of Ser. No. 168,936, Jul. 11, 1980, Pat. No. 4,334,643.

[51] Int. Cl.³ .................. A01M 31/06; A45F 3/04
[52] U.S. Cl. ........................ 224/153; 43/3; 224/210
[58] Field of Search ............ 43/2, 3; 73/188; D22/21; D10/59; 224/153, 209, 215, 151, 210

[56] References Cited

U.S. PATENT DOCUMENTS

| | | | |
|---|---|---|---|
| 1,316,566 | 9/1919 | Fauble | 43/3 |
| 2,441,753 | 5/1948 | Carpenter | 43/3 |
| 2,746,196 | 5/1956 | Karr | 43/3 |
| 3,029,541 | 4/1962 | Palmer | 43/3 |
| 3,800,457 | 4/1974 | Barrett | 43/3 |
| 4,172,335 | 10/1979 | Farmer | 43/3 |
| 4,334,643 | 6/1982 | Farmer | 224/153 |

FOREIGN PATENT DOCUMENTS

| | | | |
|---|---|---|---|
| 241684 | 10/1910 | Fed. Rep. of Germany | 224/210 |
| 277745 | 8/1913 | Fed. Rep. of Germany | 224/209 |
| 588533 | 11/1933 | Fed. Rep. of Germany | 224/153 |
| 1338893 | 8/1963 | France | 224/210 |

*Primary Examiner*—Allan N. Shoap
*Attorney, Agent, or Firm*—Howard I. Podell

[57] ABSTRACT

A goose or other fowl decoy unit may be assembled to simulate a sentinel or feeding bird. The head and neck of the unit is joined to a stake portion for staking into the ground. The body of the unit is provided with a slot through which the head passes and engages with a notch on the neck in such a manner that sideward rocking of the body due to wind is permitted to simulate a feeding bird. When disassembled, a plurality of units may be rested together in a stack which may be in the form of a back pack.

7 Claims, 17 Drawing Figures

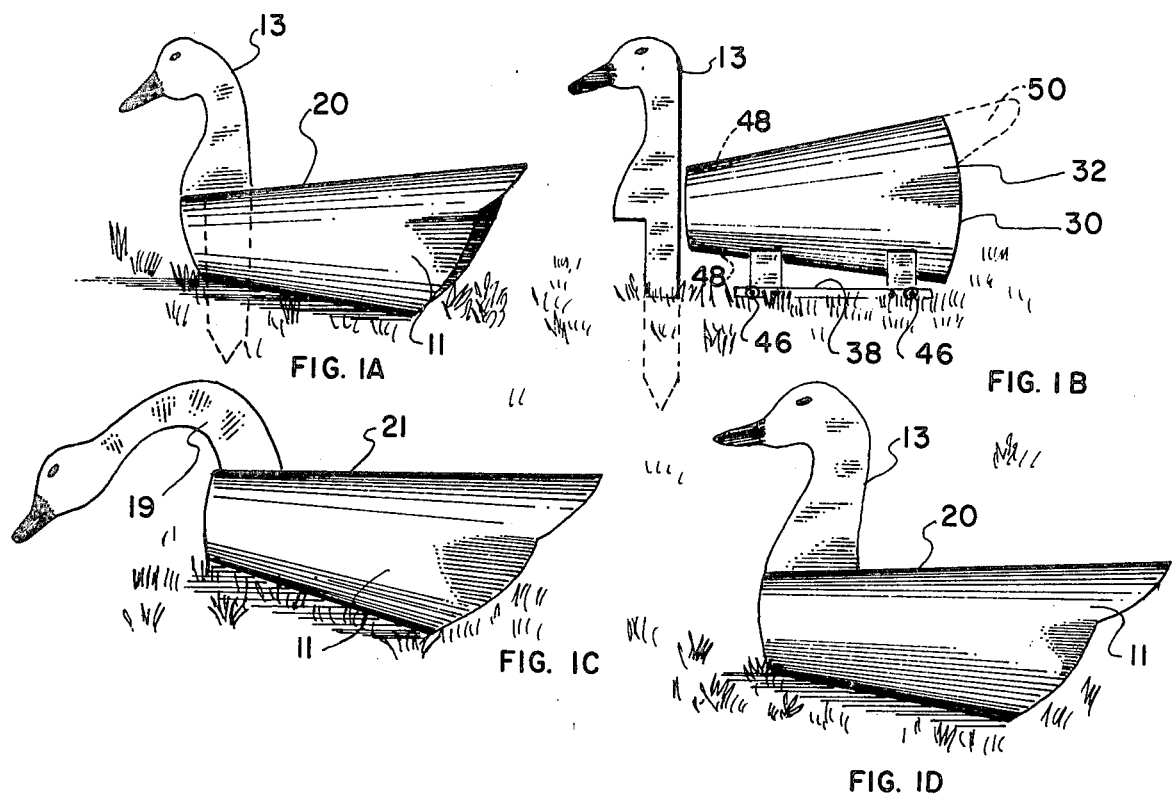
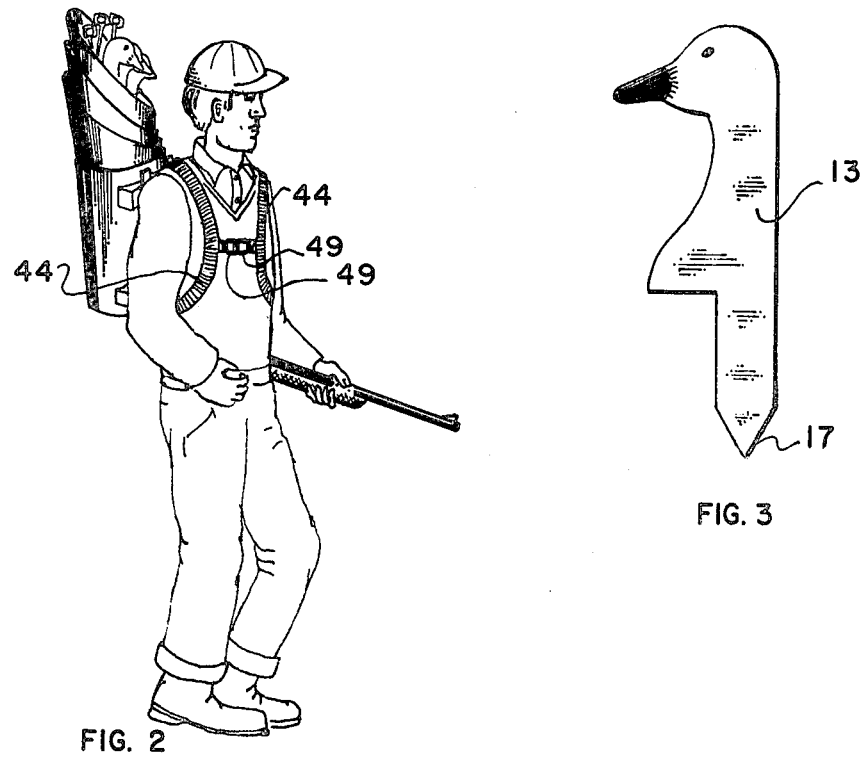

4,475,674

GOOSE DECOY BACK PACK

This application is a continuation-in-part of pending application Ser. No. 168,936, filed Jly 11, 1980 by the same inventor, which issued on June 15, 1982, as U.S. Pat. No. 4,334,643.

FIELD OF THE INVENTION

This invention relates generally to goose decoy units, and particularly to nested such units which may be carried in the form of a back pack, when disassembled, and in which some of the assembled decoy units each will simulate a goose in the sentinel position, while other assembled units will simulate geese in the feeding position.

BACKGROUND OF THE INVENTION

U.S. Pat. No. 4,172,335 by the same applicant describes a series of nestable units which each may be assembled to form a goose decoy when staked into the ground, and which may be carried in a quiver slung over a shoulder of the user. Other disassemblable goose decoy units are disclosed in U.S. Pat. No. 1,316,566; 3,470,645; 2,639,534; 2,755,588; 3,245,168; 282,851; 2,947,104; and 3,029,541.

SUMMARY OF THE INVENTION

This invention resides in a goose or other fowl decoy unit, which may be assembled to simulate a sentinel or alternatively a feeding goose. In the disassembled position, the units may be nested together in a stack which may be in the form of a back pack.

Each decoy unit consists of a separate head unit and a body unit. The body unit is formed of sheet curved as a partial conic section. The head unit is formed as a ribbed stake for fixing into the ground, adjacent to a body section or through a slot in the body section so as to hold the body section in place. The head units may be alternatively shaped to resemble a sentinel bird in which the head is held erect above the body, or as a feeding bird in which the head is held in a downward posture pointed towards the ground. The head portion of the head unit is shaped to resemble the head and bill of a fowl and is joined to the stake section of the head unit by the neck section. A notch extends in the neck section of the head unit from the forward edge of the neck section towards the axis of the neck section, with said notch a bit wider than the thickness of the sheet of the body unit adjacent the slot in the body unit. The slot of the body unit is prefereably located forward of the center of balance of the body unit.

Consequently, with the head unit staked into the ground through the slot of the body unit, the forward portion of the body unit adjacent the slot may nest within the notch of the neck section so that the body section rests on the lower edge of the notch with the upper edge of the notch bearing against the upper surface of the body section. As a consequence of this suspension, the body section may rock in sideward arcs due to wind action but is restrained from rotating in a vertical plane, so as to simulate a feeding bird.

BRIEF DESCRIPTION OF THE DRAWINGS:

The objects and features of the invention may be understood with reference to the following detailed description of an illustrative embodiment of the invention, taken together with the accomapnying drawings in which:

FIGS. 1(a)-1(d) are perspective view of the invention employed, when empty, as decoy units;

FIG. 2 is a perspective view of the invention in use as a back pack carrier of goose decoy units;

FIG. 3 is an elevation view of a stake and head unit of a decoy;

Figure 6:
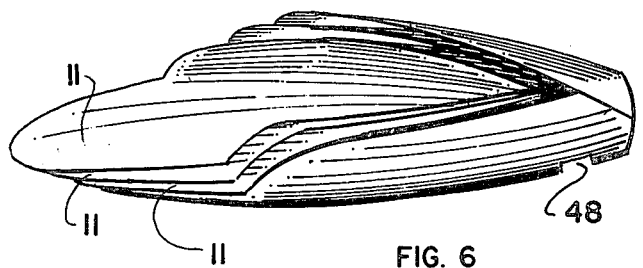
FIG. 6 is a perspective view of several body section of the decoys staked together.

DESCRIPTION OF THE PREFERRED EMBODIMENT:

Turning now descriptively to the drawings, in which similar reference characters denote similar elements throughout the several views, FIGS. 1(a)-1(d) illustrate goose decoys 20 and 21 in use. The decoys are formed of a hollow sheet material body section 11 that is bent on a partial conic surface. As shown in FIG. 6, several such body sections 11 may be stacked together.

A separate head unit 13 is detachably mounted through a slot 48 in a body section 11 so as to project above the body section. As shown in FIG. 3, the head unit 13 may be formed with a pointed bottom tip 17 to serve so that the unit 13 may be staked into the ground. Head units may be of various shape, such as unit 19. Alternatively, head units 14 may be of a shape to be detachably fitted to the body section 11 by a stake rod 16.

Body sections 11 are of a similar size and shape so that they nest one-within-the-other as shown in FIG. 6, and within the conic section shaped container 32 of back pack unit 30, with preferably the conic sections of all decoy sections 11 and of container 32 being substantially of a similar conical shape with respect to the profile angle of opposed conical generated element lines 33. The body section of container 32 is formed with a flat solid circular bottom plate 55 so that the container 32 may hold small accessories as desired.

container 32 is fixed to two spaced transverse members 34, 36 each joined to two spaced longitudinal flat bars 38 that extend away from members 34, 36 in the direction opposite to the container body 32. Padding 42 is fixed along the external surface of each bar 38 along its length. Preferably bars 34, 36 are parallel to each other and to the axis of the conical section of container 32.

A pair of shaped straps 44 are detachably fitted by mating fasteners 45, on strap sections 41, 43 to fasteners 46 on the opposed end sections of each bar 38. A front end of each strap section 43 is formed with a buckle unit 49, with one buckle unit 49 shaped so as to matingly detachably engage the other buckle unit, when the straps fasten the back pack 30 against the back of the user as shown in FIG. 2.

Figure 8:
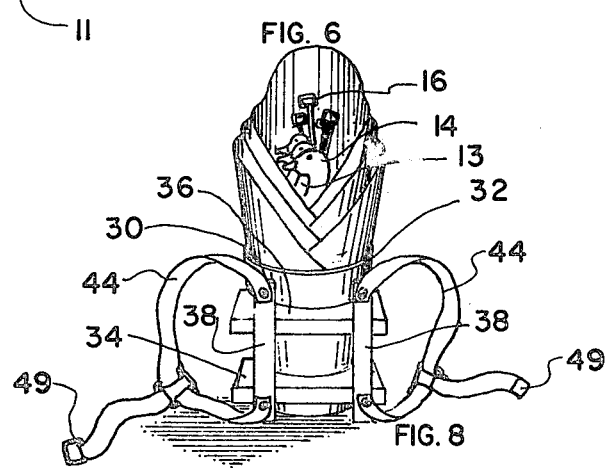
FIG. 8 is a perspective view of the invention, complete with staked decoy units.

As shown in FIG. 8, the device may be rested on the ground in the vertical position of the axis of the container for ease in removing staked bodies and sections of the decoys.

Figure 4:
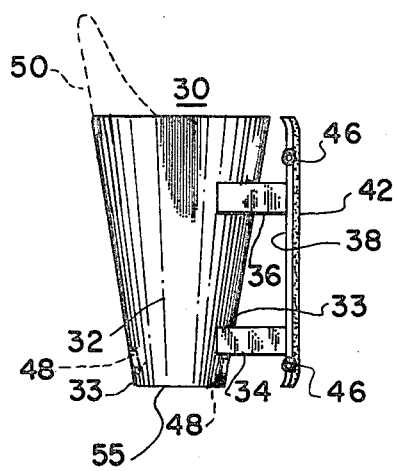
FIG. 4 is a side view of the invention.
Figure 5:
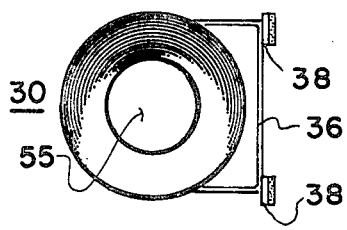
FIG. 5 is a plan view of the invention.
Figure 7:
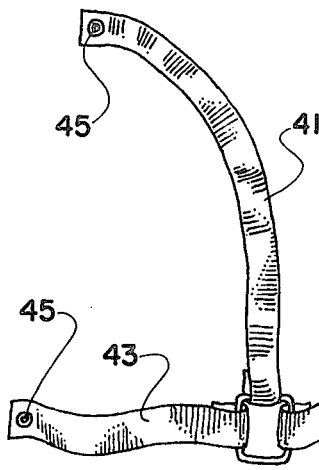
FIG. 7 is a detail side view of the strap of the invention.

As shown in FIG. 1(b) and 4, the empty unit may be rested on the bars in a free-standing horizontal orientation so that the device serves as a body section of a decoy, with a head unit 13 mountd either adjacent to the bottom end of the container 32 as shown, or with a head unit fastened through a slot 48 shown in dash lines in FIGS. 1(b) and 4. FIGS. 1(a), 1(c) and 1(d) show the head unit inserted through slot 48.

Thus, the back pack container of goose decoys, itself, serves as an additional goose decoy. To increase the resemblance of the container body to that of a goose decoy body, the wider (rear or upper) end of the container body 32 may be fitted with a tail projection section 50 as shown in dash lines in FIGS. 1(b) and 4.

FIGS. 9-14 illustrate alternative embodiments of the invention in which the body unit is suspended above the ground, by the stake unit, so as to be able to rock in a horizontal plane when acted upon by wind forces, in similar motion to a feeding goose.

Figure 9:
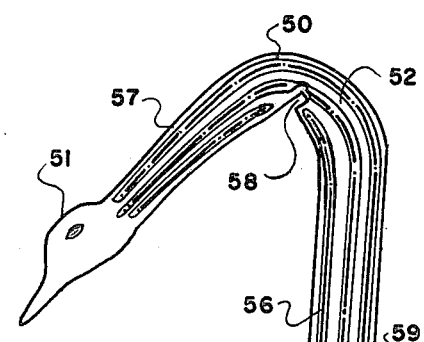
FIG. 9 is a side view of an alternative embodiment of the stake and head unit.
Figure 11:
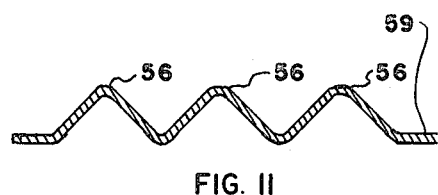
FIG. 11 is a sectional view taken along line XI—XI of FIG. 9.
Figure 13:
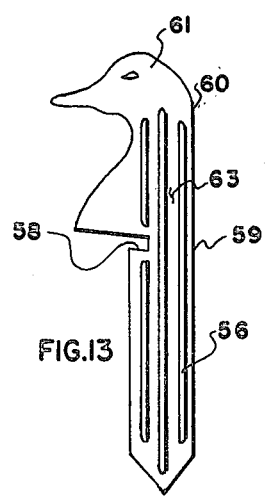
FIG. 13 is a side view of a second alternative embodiment of the head and stake unit.

As shown in FIGS. 9 and 13, the head stake unit 50 may be shaped with a downward inclined head and neck section 51, 57 to resemble a feeding goose, or unit 60 may be shaped with a vertically erect neck section 63, with the head section 61 uppermost above the neck section 63 as in the case of a sentinel goose. In both alternative embodiments, a notch 58 extends inwards from the forward portion of the uppermost portion of the stake section 59 with said notch 58 being of greater width than the thickness of the sheet material of body section 11. Embossed spaced ridges 56 extend the length of the stake sections 59 to provide stiffness.

Figure 10:
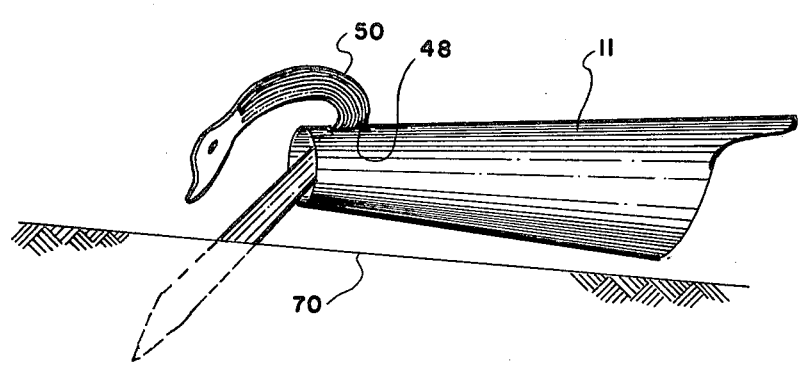
FIG. 10 is a side view of the alternative embodiment of the invention, in use.
Figure 14:
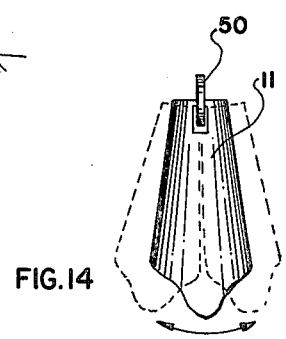
FIG. 14 is a top view of the alternative embodiment in use.
Figure 12:
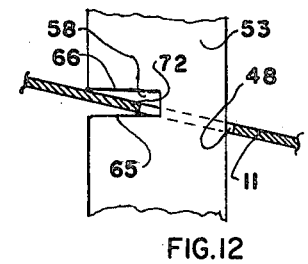
FIG. 12 is detail side sectional view of the alternative embodiment.

Stake sections 56 are of a lesser transverse width than the length of slot 48 of the body section 11 so as to readily fit into slot 48. As shown in FIGS. 10 and 12, when assembled, the forward border 72 of slot 48 of the body 11 is rested inside of notch 58 so that the body section is suspended by the lower surface 65 of notch 58 with the upper surface of body 11 bearing against the upper surface 66 of notch 58. Consequently, body 11 is suspended above the ground level 70 and may be rocked in sidewards fashion by the wind to simulate the waddling motion of the rear of the body of a goose as shown by dash lines in FIG. 14. The upper and lower surfaces of notch 58 restrain vertical movement of body 11 when so suspended. The sidewards motion of body 11 is limited only by the sliding friction of the body section against the upper and lower surfaces bounding notch 58. However, both upper and lower surfaces physically restrict substantial vertical motion of the body.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A decoy unit which may be assembled to resemble a bird and may be staked in position, comprising
   a body section formed substantially of sheet material and to extend generally along a conic-type surface,
   a separate neck section, shaped in the profile of a neck and head of a bird, joined to a stake section,
   said stake section terminating in a pointed tip, with
   mutually engageable means in said body section and said neck section of a shape to suspend the body section from the neck section in the assembled mode when said neck section is staked into ground, in which
   said mutually engagable means is shaped to permit sidewards motion of the said body section relative to the longitudinal axis of said body section with respect to the said neck section in response to wind, in the assembled position, when the said neck section is staked into ground so that the action of wind upon an assembled unit that is staked in position is to cause a lateral horizontal motion of the body section so as to simulate life-like waddling motion of a bird.

2. The invention as recited in claim 1 in which said engageable means is shaped to restrict motion of the body section in a generally vertical plane in said assembled and staked position.

3. The invention as recited in claim 1 in which the sheet forming the surface of the body section is formed with a slot in the upper portion of said body section of a size to permit free insertion of the stake section through the upper portion of the body section, with the stake section formed with a notch extending inwards from the forward edge of the stake section, said notch of a greater height than the thickness of said body sheet, such that said slot and said notch form the boundary of the said engageable means.

4. The invention as recited in claim 1 in which said body section is shaped so as to be nestable within a similar body section.

5. The invention as recited in claim 4 in which one such body section that is fitted with said engageable means is externally fitted with back pack support means, in which said body section is also shaped with means to serve as a container so as to be both adaptable for carrying other disassembled units of the invention as well as serving as a body section of a decoy.

6. The invention as recited in claim 1 in which a neck section is shaped to resemble the outline of the neck of a goose in a sentinel position, when the invention is assembled in place.

7. A decoy unit which may be assembled to resemble a bird and may be staked in position, comprising
   a body section,
   a separate neck section, shaped in the profile of a neck and head of a bird, joined to a stake section,
   said stake section terminating in a pointed tip, with
   mutually engageable means in said body section and said neck section of a shape to suspend the body section from the neck section in the assembled mode when said neck section is staked into ground, in which
   said mutually engageable means is shaped to permit sidewards motion of the said body section relative to the longitudinal axis of said body section with respect to the said neck section in response to wind, in the assembled position, when the said neck section is staked into ground so that the action of wind upon an assembled unit that is staked in position is to cause a lateral horizontal motion of the body section so as to simulate life-like waddling motion of a bird.

* * * * *